Dec. 29, 1936.     H. DIMMIG     2,066,100
APPARATUS FOR THE TREATMENT OF HYDROCARBON OIL
Filed Oct. 30, 1934     2 Sheets-Sheet 2
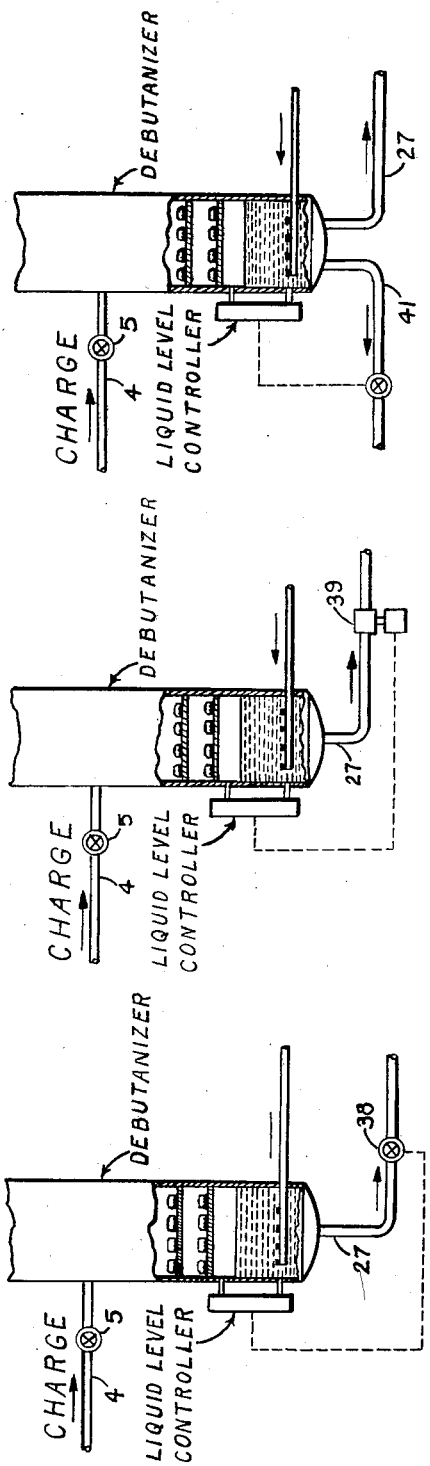
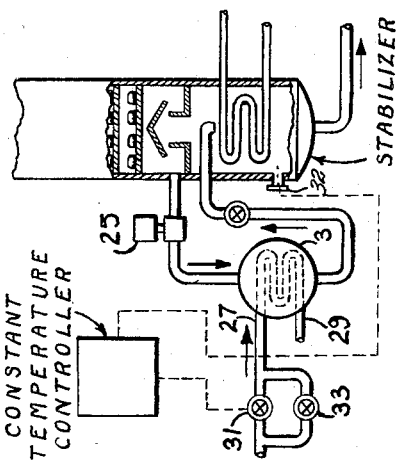
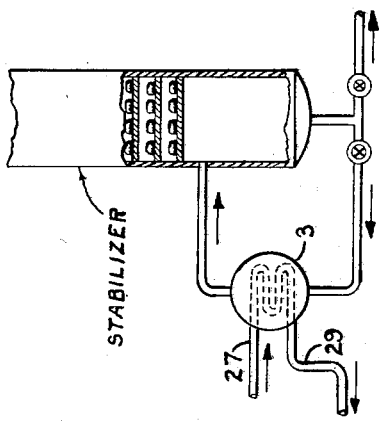
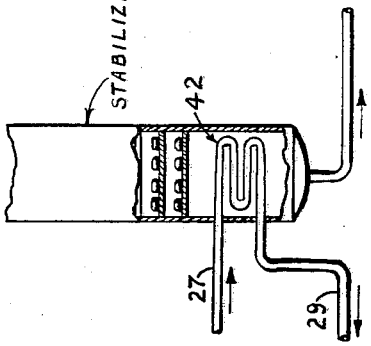
Howard Dimmig
INVENTOR
BY Pike H. Sullivan
ATTORNEY Patented Dec. 29, 1936

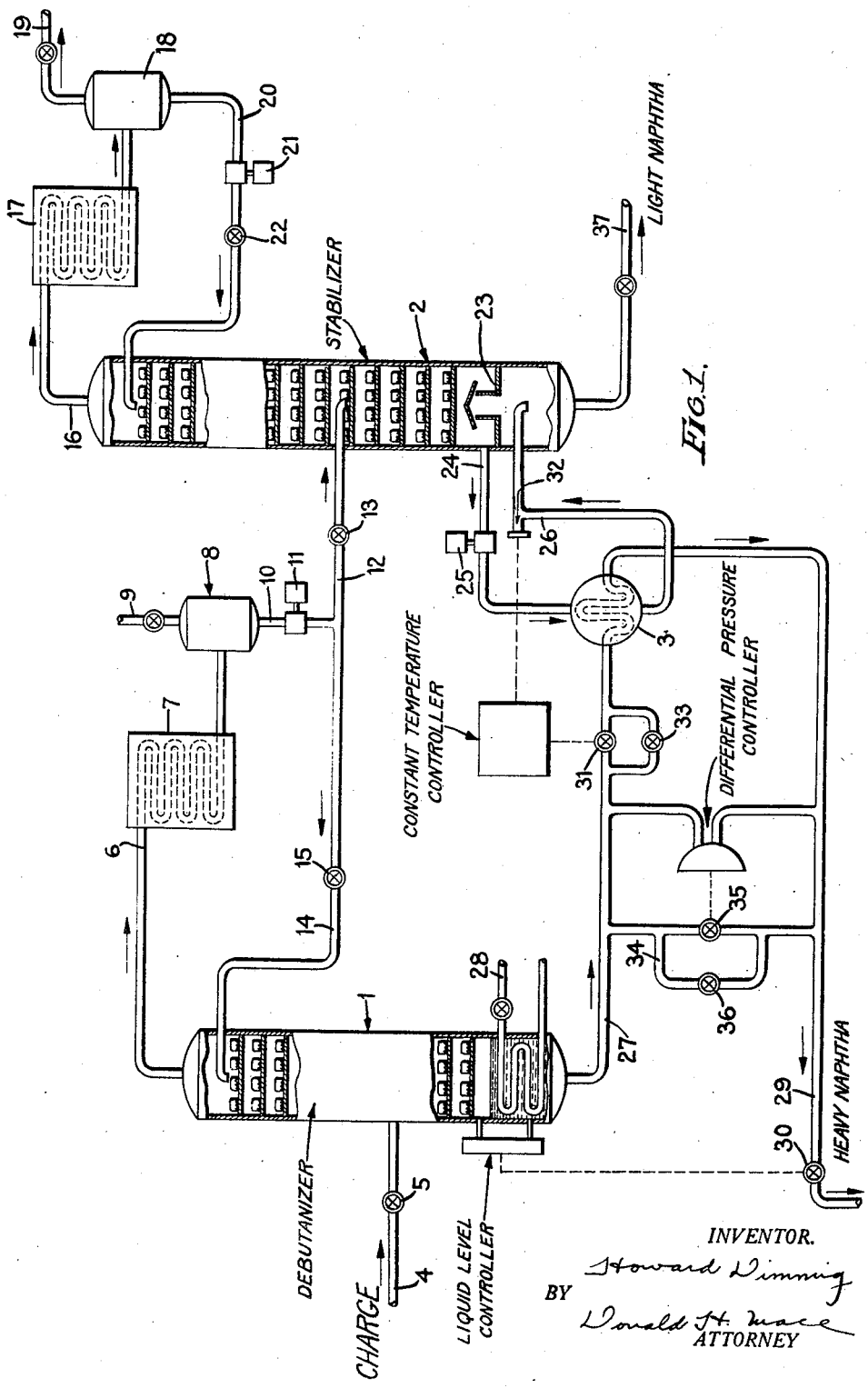

2,066,100

UNITED STATES PATENT OFFICE 2,066,100

APPARATUS FOR THE TREATMENT OF HYDROCARBON OIL

Howard Dimmig, New York, N. Y., assignor to Gasoline Products Company, Inc., Newark, N. J., a corporation of Delaware Application October 30, 1934, Serial No. 750,625

7 Claims. (Cl. 196—132)

This invention relates to apparatus for the stabilization of gasoline or other hydrocarbon distillate and pertains more particularly to apparatus for automatically maintaining constant the temperature at which the stabilization process is carried out.

It is an object of my invention to provide an improved apparatus for stabilizing hydrocarbons whereby the distillate is stabilized under constant temperature conditions.

Still another object of my invention is to provide an improved process and apparatus for the simultaneous debutanization of a gasoline distillate and stabilization of the lighter components thereof, the debutanization process being carried out so that a constant level of liquid is maintained in the debutanizer while the stabilization process is carried out in such a manner that the temperature at which the stabilization is effected is maintained constant, the heat necessary for carrying out the stabilization process being derived by indirect heat exchange with the hot products withdrawn from the debutanizing operation.

Attempts have been made heretofore to debutanize gasoline distillate so as to separate the lighter constituents therefrom, these lighter constituents being passed directly to a stabilizer while the heavier constituents are withdrawn in liquid form for acid treatment or other refining steps, and to supply heat to the base of the stabilizer column by indirect heat exchange with the heavier liquid components withdrawn from the debutanizing operation, while maintaining constant the temperature in the base of the stabilizer automatically by operation of a constant temperature control valve which is responsive to temperature in the base of the stabilizer column and serves to vary the amount of liquid from the debutanizer which flows in indirect heat exchange with the liquid at the base of the stabilizer column, so that the desired temperature therein is maintained, and while at the same time maintaining a constant level of liquid in the base of the debutanizer column. These attempts have been only partly successful in many instances on account of the variation in the quantity of liquid collecting in the debutanizer and the resulting variation in the rate at which this liquid must be withdrawn to maintain a constant level in the debutanizer. As a result of the variation in the rate of withdrawal of this liquid a variation in pressure has been imposed upon the constant temperature control valve regulating the quantity of debutanized liquid flowing through the indirect heat exchanger to supply heat to the base of the stabilizer column, this variation in the pressure causing inaccuracies in the operation of the constant temperature controller with resultant variation in the temperature at the base of the stabilizer column.

In accordance with my invention this difficulty is obviated by providing an automatic differential pressure controller for maintaining constant the pressure drop across the terminal of the constant temperature control valve and the indirect heat exchanger, this valve functioning to by-pass greater or lesser amounts of the debutanized liquid around the indirect heat exchanger, whereby a constant liquid level may be maintained in the base of the debutanizer without causing a variation in the pressure drop across the terminals of the constant temperature control valve and the indirect heat exchanger.

The invention may obviously be utilized in conjunction with a stabilizer wherein the distillate to be stabilized is derived from a receiving drum instead of from a debutanizing column. The operation would be substantially the same and a constant level of liquid would be maintained in the receiving drum. The invention may likewise be used without the liquid lever control mechanism if desired.

The above mentioned and further objects and advantages of my invention and the manner of obtaining them will be more fully explained in the following description taken in conjunction with the accompanying drawings wherein, Figure 1 represents diagrammatically a stabilizing system embodying my invention.

Figure 2 is a fragmentary view of the bottom section of the debutanizer showing a further modification thereof.

Figure 3 is a similar fragmentary section of the debutanizer showing a further modification.

Figure 4 is a similar view of the bottom of the debutanizer showing an additional modification.

Figure 5 is a fragmentary view of the bottom section of the stabilizer showing a further modification of my invention.

Figure 6 is a similar fragmentary view of the bottom section of the stabilizer showing another modification, and Figure 7 is a similar fragmentary view of the bottom section of the stabilizer and constant temperature controller illustrating a further modification.

Referring more particularly to Figure 1 of the drawings, reference numeral 1 indicates a debutanizing tower, 2 a stabilizer tower and 3 an indirect heat exchanger whereby heat is supplied to the base of the stabilizer column. Distillate charging stock to be treated is introduced through charging line 4 having control valve 5 into the debutanizing column 1 under any desired pressure and in the column mentioned is separated into vapors and unvaporized constituents, the former passing upwardly through the debutanizing column around baffle plates or other suitable contacting means while the latter passes downwardly through the column in mixture with reflux condensate generated by the partial condensation of the vapors. The vaporized constituents are removed from the top of the debutanizer column through vapor pipe 6 and condenser 7, resulting condensate being collected in the receiver 8. This receiver may be provided with a gas vent line 9, and have a liquid draw-off line 10 and pump 11 which serve to direct the distillate through conduit 12, having control valve 13, into the stabilizer tower 2. A portion of the distillate may be directed through pipe 14, having control valve 15, into the top of the debutanizer column as a refluxing medium. In the stabilizer tower the introduced distillate separates into vapors and liquids, the former passing upwardly through the tower around baffle plates or other suitable contacting means while the latter pass downwardly against a rising stream of vapors generated in the base thereof by the suitable application of heat. The undesirably light vapors and incondensible gases pass off from the top of the stabilizer through vapor line 16 and partial condenser 17, any resultant condensate being collected in the receiver 18. The uncondensed gases may be removed from the process through valved vent line 19 while condensate formed may be returned to the top of the stabilizer through line 20, having pump 21 and control valve 22, as a refluxing medium.

A portion of the downwardly flowing liquid is collected on trap-out tray 23 in the base of the stabilizer tower, withdrawn therefrom through pipe 24, and forced by pump 25 through the indirect heat exchanger 3 and back into the base of the stabilizer tower through pipe 26. The other side of the indirect heat exchanger 3 is supplied with hot debutanized liquid from the base of the debutanizer tower 1, by way of line 27. This liquid is relatively hot on account of the debutanizing treatment received in the tower 1, heat having been supplied for carrying out the process by any suitable means such as the indirect heat exchange coil 28 in the base of the debutanizer tower, which coil may be supplied with any hot fluid such as steam, or hot oil from the process. Or if desired, the heat necessary for debutanizing may be supplied by directly introducing steam or hot gases into the base of the debutanizer column, as shown in Figures 2, 3 and 4. The hot debutanized liquid flows through the pipe 27 and indirect heat exchanger 3, finally leaving the process through conduit 29, having liquid level control valve 30, which is responsive to the level of liquid in the base of the debutanizer tower 1, the arrangement being such that, upon an increase in the level of the liquid in the debutanizer tower above a predetermined value, the valve 30 is opened additionally to permit the escape of the liquids from the debutanizer tower so as to restore the level to the desired position, and vice versa.

The amount of the hot debutanized liquid which should pass through the indirect heat exchanger 3 is dependent upon the temperature in the base of the stabilizer tower, the higher the temperature the less the amount of debutanized liquid necessary to pass through the indirect heat exchanger, in order to maintain the selected temperature conditions. The regulation of the quantity of debutanized liquid flowing through the indirect heat exchanger 3 is effected by a constant temperature control valve 31 the adjustment of which is responsive to the temperature at the point 32 in the pipe 26 by which the heated liquid is returned to the base of the stabilizer tower, the arrangement being such that upon a rise in the temperature of the liquid at point 32 above a predetermined value the valve 31 is closed somewhat so as to decrease the amount of heating fluid flowing through the other side of the indirect heat exchanger 3, whereby a lesser amount of heat is transferred to the oil passing through pipe 26, and conversely upon a drop in the temperature at point 32 below the predetermined value the valve 31 will automatically be opened somewhat to reestablish the selected temperature condition. Reference numeral 33 indicates a manually controlled valve by-passing the automatic valve 31 in the usual manner, the rough adjustment being secured by means of the manual valve 33 while the automatic regulation is constantly carried out by the temperature responsive valve 31.

Any additional quantity of debutanized liquid which must be removed from the base of the debutanizer 1, over and above that necessary for passing through the indirect heat exchanger 3, is passed through by-pass line 34 under the automatic control of the differential pressure control valve 35 and its associated mechanism which may be, for example, of a type similar to that sold by Mason-Neilan Regulator Company as "Type 47-D—Differential Pressure Regulator", which is responsive to the differential pressure between the pipe 27 and pipe 29, that is, responsive to the differential pressure existing across the terminals of the control valve 31 and indirect heat exchanger 3; the arrangement being such that, upon an increase in the differential pressure across the points mentioned, above a predetermined value, the automatic valve 35 will be opened somewhat to permit a greater amount of liquid to escape to the pipe 29 and thereby relieve the differential pressure somewhat, while upon a decrease in the differential pressure mentioned across the terminals of the automatic control valve 31 and indirect heat exchanger 3, the valve 35 will be automatically closed somewhat to restore the desired pressure differential. Reference numeral 36 indicates a manually controlled valve by-passing the automatic valve 35 in the usual manner. The rough adjustment is obtained by manipulation of the valve 36 while the fine adjustment is constantly maintained by the automatic valve 35. In lieu of the liquid level control valve 30 in line 29, a liquid level control valve 38 may be located in the pipe 27 between the point of connection of that pipe with the base of the debutanizer and with the by-pass pipe 34, if desired, as shown in Figure 2.

In operation the distillate to be treated is introduced into the debutanizer tower 1 and is therein separated into a light and a heavy fraction, the former passing upwardly through the tower and off through vapor line 6 in vapor form, while the latter collects in the base of the tower as a liquid. The level of liquid in the base of the debutanizer tower is maintained at a constant position by the operation of liquid level control valve 30 in the pipe 29. After condensation in the condenser 7 the light fraction is collected in receiver 8 and is passed therefrom through the pipe 12 into the stabilizer tower 2, a portion being returned to the top of the debutanizer tower 1 through pipe 14, if desired.

In the stabilizer tower the introduced lighter fractions are stabilized by separation of the undesirably light constituents as vapors, which pass off through the vapor line 16, and desirably heavy constituents which collect in the base of the tower and are withdrawn therefrom through pipe 37 for blending or any other desired use. A portion of the liquid flowing down through the stabilizer tower is collected on the trap-out tray 23 and passed through the indirect heat exchanger 3 and back into the base of the stabilizer tower through pipe 26. The quantity of liquid so circulated is maintained substantially constant by the constant operation of pump 25 while the temperature of the liquid returned to the base of the tower through pipe 26 is maintained substantially constant by the action of the temperature control valve 31, which is automatically adjusted responsive to a variation in temperature at the point 32 in the pipe 26, so as to vary the amount of hot liquid flowing from the base of the debutanizer through the other side of the indirect heat exchanger 3 and through the pipe 29 from the process. Accuracy of operation of the temperature responsive control valve 31 is aided by maintaining a constant pressure differential across the terminals of the valve 31 and indirect heat exchanger 3, this being effected by the differential pressure control valve 35, which serves to by-pass greater or lesser quantities of the debutanized liquid directly to the line 29, without passage thereof through the indirect heat exchanger 3. The operation of this valve is such that upon a rise in the differential pressure across the valve 31 and heat exchanger 3, the valve 35 is opened somewhat to permit an additional amount of liquid to pass directly to the line 29 and out of the body. Upon a decrease in the differential pressure the opposite operation of the valve 35 is effected.

A rough adjustment of the fluid flow is made by manipulation of the manually operable main valves 33 and 36, if desired, so that only a vernier action is required of the automatic valves 31 and 35. The valve 30 is, during normal operation of the apparatus, always open to a certain extent. The valves 31 and 35 merely determine through which path the oil withdrawn from the base of tower 1 will find its way out of the system. They are apportioning valves. Disregarding by-pass valves 33 and 36 the sum total of the oil flow through the valves 31 and 35 is the same as that through the valve 30, regardless of the momentary adjustment of these valves. If desired, instead of measuring the temperature at the point 32, the valve 31 might be made responsive to the temperature in the base of the stabilizer tower 2, as shown in Figure 7, or at any other desired or selected point therein. In place of an external indirect heat exchanger 3 a coil might be placed directly within the base of the stabilizer tower 2, as shown in Figure 5, through which the debutanized liquid would be passed in the same manner as it is passed through the indirect heat exchanger 3, described hereinbefore or instead of using the trap-out tray 23 the liquid for heat exchange might be withdrawn directly from the base of the stabilizer, as shown in Figure 6. In any event the means for supplying heat to the base of the stabilizer acts as a reboiler. A separate liquid draw-off line 41 as shown in Figure 4 might be arranged constantly to bleed off the debutanized liquid from the base of the tower 1 while another portion thereof is passed through the indirect heat exchanger 3. It is preferable however to utilize an arrangement similar to that shown in Figure 1, so that if desired all of the debutanized liquid which is to be withdrawn from the base of the debutanizer column may be sent through the indirect heat exchanger 3, whereby the benefit of all of the heat available may be obtained.

The operating conditions of temperature and pressure are dependent upon the character of the charging stock and the character of the stabilized distillate desired, the system working equally well regardless of the specific temperature and pressure conditions selected. As shown in Figure 3, where the pressure in the debutanizer tower is relatively low it may be desirable to provide a pump 39 in the line 27 positively to force the liquid through the indirect heat exchanger 3, and in this system the speed of the pump might be regulated by the liquid level controller in any well known manner, so that upon an increase in the level of the liquid in the base of the debutanizer tower the speed of the pump would be increased to eject from the tower a greater amount of liquid, so as to bring the level down to the selected point. In this event the valve 30 would not be required but the remainder of the apparatus could be utilized just as described already hereinbefore.

As a specific example, given merely for the purposes of illustration, when an ordinary gasoline distillate is to be treated the debutanizer may be operated under a pressure of about 100 pounds per square inch and the stabilizer may be operated under a pressure of about 250 pounds per square inch. In this event the temperature in the base of the debutanizer might be about 400° F. and that in the base of the stabilizer about 290° F. With these conditions the end point of the light naphtha withdrawn from the base of the stabilizer would be about 220° F. The conditions mentioned are merely illustrative of one method of operation and it should be understood that the pressures and temperatures may be varied considerably depending upon the character of the distillate being treated and the characteristics of the final desired product. In any event the temperature of the liquid withdrawn from the base of the debutanizer should be high enough to impart the necessary amount of heat to the base of the stabilizer where the debutanizer liquid is utilized as the sole source of stabilizer heat. However, as shown in Figure 7, an auxiliary heating means might be provided for the stabilizer in which case only a part of the total heat for stabilization would have to be supplied from the debutanizer liquid. In this event the auxiliary supply might constantly impart a fixed amount of heat to the stabilizer while the additional amount of heat necessary to control the operation would be automatically imparted from the debutanized liquid.

While I have described a particular embodiment of my invention for the purposes of illustration, it should be understood that various modifications and adaptations thereof may be made within the spirit of the invention as set forth in the appended claims.

I claim:
1. Apparatus for the stabilization of hydro- carbons comprising a stabilizer tower, means for introducing hydrocarbon fluid to be stabilized into said tower, a reboiler for supplying heat to the base of said tower, means for passing a hot fluid from an external source through said reboiler, a constant temperature controller for regulating the flow of hot fluid through said reboiler to maintain constant the temperature in the base of said stabilizer tower, and means for maintaining a constant differential pressure across the terminals of said constant temperature control valve and said reboiler.

2. Apparatus for the stabilization of hydrocarbons comprising a stabilizer tower, means for introducing distillate to be stabilized into said tower, a reboiler for supplying heat to the base of said tower, a reservoir for hot liquid, a conduit for passing hot liquid from said reservoir through said reboiler, a control valve in said conduit, means responsive to the temperature in the base of said stabilizer for adjusting said control valve so as to cause a greater amount of hot liquid from said reservoir to flow through said reboiler upon a drop in the temperature at the base of said stabilizer below a predetermined value, a by-pass line around said valve and said reboiler, a valve in said line, and a differential pressure controller connected to said valve to maintain a constant differential pressure between the inlet side of the control valve in the conduit first mentioned and the outlet side of said reboiler.

3. Apparatus in accordance with claim 2 wherein a liquid level control valve is arranged to vary the flow of liquid from said reservoir through said conduit so as to maintain a constant level of liquid in said reservoir, and means for introducing liquid into said reservoir.

4. Apparatus for the stabilization of hydrocarbons comprising a debutanizer tower, means for introducing the hydrocarbons to be treated into said debutanizer tower, a stabilizer tower, means for introducing light vaporized hydrocarbons from the top of said debutanizer tower into an intermediate point in said stabilizer tower, means for removing residue gases from the top of said stabilizer tower and means for removing stabilized liquid from the base of said stabilizer tower, a reboiler for supplying heat to the base of said stabilizer tower, a conduit for withdrawing heating liquid from the base of said debutanizer tower and passing it through said reboiler, a second conduit for conducting the heating liquid from said reboiler out of the system, a temperature control valve in said first-mentioned conduit, means operatively connected to said control valve and responsive to the temperature indicative of the temperature in the base of said stabilizer tower, for adjusting said temperature control valve to regulate the flow of heating liquid through said reboiler, so as to increase the amount of liquid flowing through said reboiler upon a drop in the temperature in said stabilizer tower below a predetermined value, and to reduce the amount of liquid flowing through said reboiler upon a rise in the temperature in said stabilizer tower above said predetermined value, a by-pass line connecting said first conduit and said second conduit to by-pass liquid around said temperature control valve and said reboiler to said conduit second mentioned, and a differential pressure controller for regulating the flow of liquid through said by-pass line so as to maintain a constant pressure differential across said temperature control valve and said reboiler.

5. Apparatus in accordance with claim 4 wherein a valve is arranged in one of said conduits and liquid level control means is connected to said valve so as to maintain a constant level of liquid in the base of said debutanizer tower.

6. Apparatus in accordance with claim 4 wherein an additional valve is located in said second-mentioned conduit and liquid level control means is provided for regulating said valve in such manner as to maintain a constant level of liquid in the base of said debutanizer tower.

7. Apparatus in accordance with claim 4 wherein said reboiler comprises an indirect heat exchanger, a trap-out tray in the base of the stabilizer tower and means for circulating liquid from said trap-out tray through said indirect heat exchanger and back into the base of the stabilizer tower.

HOWARD DIMMIG.